(12) United States Patent
Rahm et al.

(10) Patent No.: US 12,157,469 B2
(45) Date of Patent: Dec. 3, 2024

(54) EXCESS REGENERATIVE BRAKING POWER DISTRIBUTED TO AIR BLOWER

(71) Applicant: Volvo Truck Corporation, Gothenburg (SE)

(72) Inventors: Fredrik Rahm, Hörby (SE); Tove Audhav, Landvetter (SE)

(73) Assignee: Volvo Truck Corporation, Gothenburg (SE)

( * ) Notice: Subject to any disclaimer, the term of this patent is extended or adjusted under 35 U.S.C. 154(b) by 175 days.

(21) Appl. No.: 17/960,482

(22) Filed: Oct. 5, 2022

(65) Prior Publication Data

US 2023/0126729 A1 Apr. 27, 2023

(30) Foreign Application Priority Data

Oct. 27, 2021 (EP) .................................... 21205008

(51) Int. Cl.
| | |
|---|---|
| *B60W 20/14* | (2016.01) |
| *B60W 10/08* | (2006.01) |
| *B60W 10/26* | (2006.01) |
| *B60W 10/30* | (2006.01) |
| *B60W 30/18* | (2012.01) |
| *B60L 1/02* | (2006.01) |

(52) U.S. Cl.
CPC ...... *B60W 30/18127* (2013.01); *B60W 10/08* (2013.01); *B60W 10/26* (2013.01); *B60W 10/30* (2013.01); *B60L 1/02* (2013.01); *B60W 2510/085* (2013.01); *B60W 2510/244* (2013.01); *B60W 2710/305* (2013.01)

(58) Field of Classification Search
CPC ... B60L 1/003; B60L 58/12; B60W 30/18127; B60W 10/30; B60W 10/08; B60W 10/26; B60W 2510/085; B60W 2510/244; B60W 2710/305

See application file for complete search history.

(56) References Cited

U.S. PATENT DOCUMENTS

| | | | |
|---|---|---|---|
| 8,505,659 B2 * | 8/2013 | Favaretto | B60K 25/00 180/65.6 |
| 10,392,018 B1 | 8/2019 | Rhodes et al. | |
| 10,486,680 B2 * | 11/2019 | Hosokawa | F02B 39/10 |
| 2014/0084820 A1 | 3/2014 | Modolo | |
| 2015/0015063 A1 * | 1/2015 | Bissontz | B60L 3/108 307/9.1 |
| 2016/0082843 A1 | 3/2016 | Semsey et al. | |
| 2016/0332520 A1 | 11/2016 | Miller et al. | |
| 2017/0305275 A1 | 10/2017 | You et al. | |
| 2024/0140259 A1 * | 5/2024 | Cox | B60L 58/12 |

FOREIGN PATENT DOCUMENTS

WO 2012128770 A1 9/2012

OTHER PUBLICATIONS

Extended European Search Report for European Patent Application No. 21205008.2, mailed Apr. 22, 2022, 8 pages.

* cited by examiner

*Primary Examiner* — Gonzalo Laguarda
(74) *Attorney, Agent, or Firm* — Withrow & Terranova, PLLC

(57) ABSTRACT

A braking system for a vehicle. Based on an electric power level of electric power generated during regenerative braking of the vehicle, an electric power system of the vehicle is controlled to supply electric power to an electric machine, which electric machine is connected to an air blower arranged in an air conduit.

13 Claims, 5 Drawing Sheets

EXCESS REGENERATIVE BRAKING POWER DISTRIBUTED TO AIR BLOWER

RELATED APPLICATIONS

The present application claims priority to European Patent Application No. 21205008.2, filed on Oct. 27, 2021, and entitled "BRAKING SYSTEM FOR A VEHICLE," which is incorporated herein by reference in its entirety.

TECHNICAL FIELD

The present invention relates to a braking system for a vehicle. The present invention also relates to a method of controlling a braking system, and a vehicle comprising such a braking system.

Although the invention will mainly be directed to a vehicle in the form of a truck using an electric traction motor propelling the vehicle, the invention may also be applicable for other types of vehicles at least partially propelled by an electric traction motor, such as e.g. an electric vehicle, a hybrid vehicle comprising an electric machine as well as an internal combustion engine for propulsion.

BACKGROUND

The propulsion systems of vehicles are continuously developed to meet the demands from the market. A particular aspect relates to the emission of environmentally harmful exhaust gas. Therefore, vehicles propelled by electric machines and/or electric machine receiving electric power from hydrogen fuel cells have been increasingly popular, in particular for trucks and other heavy-duty vehicles.

In comparison to a vehicle propelled solely by an internal combustion engine (ICE), a vehicle propelled by an electric machine conventionally struggles with obtaining the desired functionality of auxiliary braking. For an ICE operated vehicle, the auxiliary braking can be achieved by means of a retarder, etc. However, for an electric vehicle, the auxiliary braking functionality can be a dimensioning factor for the cooling system since the cooling capacity of e.g., a fuel cell electric vehicle (FCEV) as well as a battery electric vehicle (BEV) is a limiting factor. The reason is that for such type of vehicles, the auxiliary braking places a lot of energy in the cooling system.

There is thus a desire to provide a braking system for a vehicle which is at least partially propelled by an electric traction motor, which braking system puts less strain to the vehicle cooling system.

SUMMARY

It is thus an object of the present invention to at least partially overcome the above-described deficiencies.

According to a first aspect, there is provided a braking system for a vehicle, the braking system comprising an electric traction motor configured to propel the vehicle and to controllably regenerate electric power during regenerative braking of the vehicle, an electric machine comprising an output shaft, an air blower connected to the output shaft of the electric machine, the air blower being operable by the electric machine by rotation of the output shaft, wherein the air blower is arranged in an air conduit, an electric power system electrically connected to the electric machine, the electric power system comprising an electric storage system configured to receive and supply electric power, wherein the electric machine is operated by electric power received from the electric power system, the electric power system being further electrically connected to the electric traction motor and configured to receive electric power during regenerative braking, and a control unit connected to the electric power system, the control unit comprising control circuitry configured to receive a signal indicative of a regenerative braking request for the vehicle, determine a level of electric power generated by the electric traction motor during the regenerative braking of the vehicle, receive a signal indicative of a current electric charging capacity of the electric storage system, compare the level of electric power generated during the regenerative braking with the current electric charging capacity of the electric storage system, and control the electric power system to supply electric power to the electric machine during the regenerative braking when the level of electric power generated during the regenerative braking is higher than the current charging capacity of the electric storage system.

The wording "air blower" should, unless stated otherwise, in the following and throughout the entire description be considered to relate to an arrangement which is configured to convey a flow of air through the air conduit. The air blower may thus be an air fan operated by the electric machine, or an air compressor operated by the electric machine. Preferably, the air blower increased the temperature level of the air flowing therethrough.

Moreover, the electric storage system should be construed, as also indicated above, as an arrangement configured to receive and supply electric power. According to a preferred embodiment, the electric storage system is a battery which can be charged by electric power during regenerative braking, or to supply electric power to e.g., the electric machine for operation of the air blower. The electric storage system thus has a charging capacity, which corresponds to the available electric power that the electric storage system can receive before being filled. The charging capacity may also be based on e.g., the temperature of the electric storage system, state of charge (SOC), etc. Accordingly, when the electric storage system has reached its maximum allowed state of charge level it cannot receive any further electric power. The braking system may thus be referred to as an electric braking system.

The present invention is based on the insight that in a situation where the vehicle is operated in a regenerative braking mode and the electric storage system is unable to receive the electric power generated during the regenerative braking operation, or if there is a desire not to regenerate more than a certain electric power level in the electric power system, the electric power system can instead supply at least a portion of the generated electric power to the electric machine which in turn, by means of the received electric power, operates the air blower to force a flow of air through the air conduit. An advantage is thus that the braking system is able to dissipate electric power which cannot be received by the electric storage system. Also, the air flowing through the air blower will be heated, and the heated air can thus be used for heating components of the vehicle in need of thermal management.

Accordingly, and according to an example embodiment, the control circuitry may be further configured to determine a level of electric power dissipation of the electric power system when the level of electric power generated during the regenerative braking is higher than the current electric charging capacity, the level of electric power dissipation being a difference between the level of electric power generated during the regenerative braking and the current electric charging capacity of the electric storage system, and control the electric power system to supply electric power to the electric machine based on the level of electric power dissipation.

Hence, the excessive electric power is used for operating the electric machine. The level of electric power dissipation may thus preferably be a desired level of electric power dissipation. Accordingly, the electric power system is controlled to supply electric power with a level corresponding to the level of electric power dissipation to the electric machine. In yet further detail, the electric power generated during regenerative braking, and which is unable/unwanted to be delivered to the energy storage system is supplied to the electric machine.

According to an example embodiment, the braking system may further comprise an air heating arrangement comprising at least one electric air heater, the air heating arrangement being arranged in the air conduit in downstream fluid communication with the air blower, wherein the at least one electric air heater is electrically connected to, and operable by, the electric power system.

The air heating arrangement is advantageously incorporated in the braking system for additionally heating the air in the air conduit. As will be evident from the below description, the air heating arrangement can also be advantageously used for dissipating electric power during regenerative braking. The air heating arrangement may preferably be an electric brake resistor arrangement, whereby the at least one electric air heater in such a case is an electric brake resistor.

According to an example embodiment, the control circuitry may be further configured to compare the level of electric power dissipation with a motor dissipation threshold of the electric machine, and to control the electric power system to supply the electric power to the electric machine and to the at least one electric air heater when the level of electric power dissipation is higher than the motor dissipation threshold.

An advantage is thus that when the electric machine is unable to receive all electric power that needs to be dissipated, the electric power system can supply electric power also to the at least one electric air heater. Thus, an improved electric energy dissipation capacity is provided. The control circuit may control the electric power system to supply a portion of the electric power to the at least one electric air heater and a remaining portion of the electric power to the electric machine, whereby the magnitude of the portions of electric power to the electric machine and the at least one electric air heater can be based on a current operating condition of the vehicle, the temperature in the at air heater arrangement, etc. Accordingly, and according to an example embodiment, a level of electric power supplied to the electric machine may be based on a temperature level of the at least one electric air heater. The control circuit may thus receive a signal indicative of a temperature level of the air heater arrangement and compare the temperature level with a predetermined temperature level. The control circuit may thereafter supply electric power to the electric machine such that the temperature level of the air heater arrangement maintains below the predetermined threshold. An advantage is hereby that the air heater arrangement is not overheated.

According to an example embodiment, the control circuitry may be further configured to receive a signal indicative of a rotational speed of the output shaft of the electric machine, and to control the electric power system to reduce the supply of electric power to the electric machine by a first electric power level and to supply electric power of the first electric power level to the air heating arrangement when the rotational speed exceeds a threshold limit.

When reducing the supply of electric power to the electric machine, the rotational speed of the output shaft will be reduced. An advantage is that the electric power system will continue to dissipate electric power while at the same time reducing the rotational speed of the output shaft. By reducing the supply of electric power to the electric machine with the same level of electric power as being instead supplied to the air heating arrangement, the electric power system will not experience an interruption in electric power dissipation. According to a further advantage, there is no need of using an inverter for controlling the air heating arrangement. The lack of an inverter thus saves space in a compartment with delimited available space, and the vehicle operator will still experience a smooth and comfortable reduction of the vehicle speed.

According to an example embodiment, the control circuitry may be further configured to control the electric power system to increase the supply of electric power to the electric machine after the supply of electric power by the first electric power level to the air heating arrangement. When the electric power system reduces the supply of electric power to the electric machine, the rotational speed of the output shaft will be reduced. An advantage is here that by supplying electric power to the air heating arrangement, the supply of electric power to the electric machine can be increased, thereby, again, slightly increasing the rotational speed of the output shaft whereby the electric power dissipation can be even further increased. A still further advantage is that the electric machine can be used for fine tuning of the electric power dissipation, while the air heating arrangement is preferably operated at a pre-defined power consumption level.

According to an example embodiment, the at least one electric air heater may comprise a first air heater and a second electric air heater arranged in series with each other. The first and second electric air heaters may also be arranged in parallel with each other. Hereby, the electric power dissipation can be even further increased, as well as to further increase the energy in the air directed out from the air heating arrangement. Accordingly, and according to an example embodiment, the control circuitry may be further configured to control the electric power system to supply electric power to each of the first and second electric air heaters.

According to an example embodiment, the control circuitry may be configured to control the electric power system to supply electric power to the first electric air heater when the level of electric power dissipation reaches a first dissipation threshold.

According to an example embodiment, the control circuitry may be configured to control the electric power system to supply electric power to the second electric air heater when the level of electric power dissipation reaches a second dissipation threshold, the second dissipation threshold being higher than the first dissipation threshold.

Hereby, the first and second electric air heaters may be used in series, or in steps, whereby the electric power system supplies electric power to the first electric air heater at a first stage when the electric power dissipation level reaches the first dissipation level. When the electric power dissipation level reaches the second dissipation level, the electric power system supplies electric power also to the second electric air heater. It should however be readily understood that the electric power dissipation level may substantially instantaneous during the regenerative braking event correspond to the second electric power dissipation level, in which situation the electric power system supplies electric power to each of the first and second electric air heaters, as well as to the electric machine.

According to a second aspect, there is provided a method of controlling a braking system for a vehicle, the braking system comprising an electric traction motor configured to propel the vehicle and to controllably regenerate electric power during regenerative braking of the vehicle, an electric machine comprising an output shaft, an air blower connected to the output shaft of the electric machine, the air blower being operable by the electric machine by rotation of the output shaft, wherein the air blower is arranged in an air conduit, and an electric power system electrically connected to the electric machine, the electric power system comprising an electric storage system configured to receive and supply electric power, wherein the electric machine is operated by electric power received from the electric power system, the electric power system being further electrically connected to the electric traction motor and configured to receive electric power during regenerative braking, wherein the method comprises the steps of controlling the electric traction motor to perform regenerative braking for the vehicle, determining a level of electric power generated by the electric traction motor during the regenerative braking of the vehicle, determining a current electric charging capacity of the electric storage system, comparing the level of electric power generated during the regenerative braking with the current electric charging capacity of the electric storage system, and controlling the electric power system to supply electric power to the electric machine during the regenerative braking when the level of electric power generated during the regenerative braking is higher than the current charging capacity of the electric storage system.

The step of determining a current electric charging capacity of the electric storage system should also be construed as predictive or estimative step. There may, for example, be situations where it is not desirable to directly charge the electric storage system as much as possible. For example, if the vehicle will enter a topology resulting in a long time braking, it could be desirable to charge the electric storage system slowly at an initial time period of the braking period, thereby resulting in a lower temperature and less aging of the electric storage system.

Effects and features of the second aspect are largely analogous to those described above in relation to the first aspect.

According to a third aspect, there is provided a vehicle comprising a braking system according to any one of the embodiments described above in relation to the first aspect.

According to a fourth aspect, there is provided a computer program comprising program code means for performing the steps of the second aspect when the program code means is run on a computer.

According to a fifth aspect, there is provided a computer readable medium carrying a computer program means for performing the steps of the second aspect when the program means is run on a computer.

Effects and features of the third, fourth and fifth aspects are largely analogous to those described above in relation to the first aspect.

Further features of, and advantages will become apparent when studying the appended claims and the following description. The skilled person will realize that different features may be combined to create embodiments other than those described in the following, without departing from the scope of the present disclosure.

BRIEF DESCRIPTION OF THE DRAWINGS

The above, as well as additional objects, features, and advantages, will be better understood through the following illustrative and non-limiting detailed description of exemplary embodiments, wherein.

DETAILED DESCRIPTION

Figure 1:
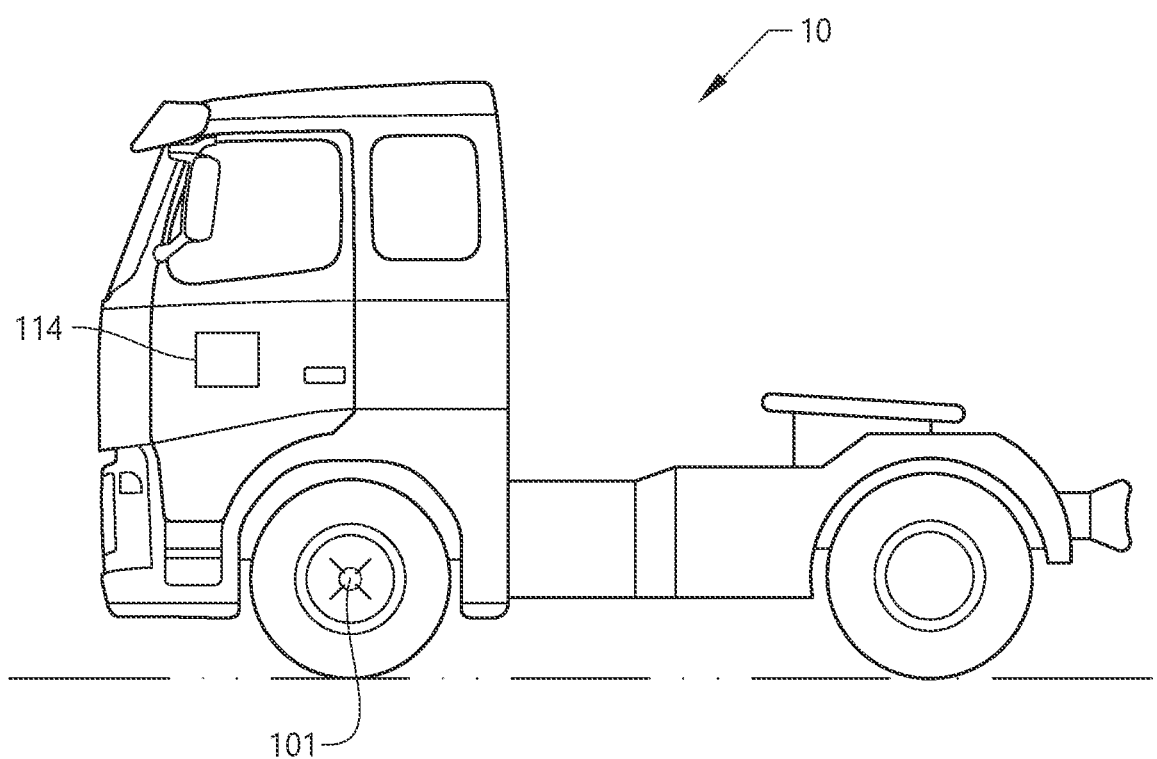
FIG. 1 is a lateral side view illustrating an example embodiment of a vehicle in the form of a truck.

The present invention will now be described more fully hereinafter with reference to the accompanying drawings, in which exemplary embodiments are shown. The invention may, however, be embodied in many different forms and should not be construed as limited to the embodiments set forth herein; rather, these embodiments are provided for thoroughness and completeness. Like reference character refer to like elements throughout the description.

With particular reference to FIG. 1, there is depicted a vehicle 10 in the form of a truck. The vehicle comprises a traction motor 101 for propelling the wheels of the vehicle. The traction motor 101 is in the example embodiment an electric traction motor 101 in the form of an electric machine, which is arranged to receive electric power from an electric power system (104 in FIG. 2) and/or directly from e.g., a fuel cell system. The vehicle 10 also comprises a control unit 114 for controlling various operations as will also be described in further detail below, and a braking system (not shown in detail in FIG. 1) operable to perform an auxiliary braking action for the vehicle 10.

The control unit 114 may include a microprocessor, microcontroller, programmable digital signal processor or another programmable device. The control unit may also, or instead, include an application specific integrated circuit, a programmable gate array or programmable array logic, a programmable logic device, or a digital signal processor. Where the control unit 114 includes a programmable device such as the microprocessor, microcontroller or programmable digital signal processor mentioned above, the processor may further include computer executable code that controls operation of the programmable device.

Figure 2:
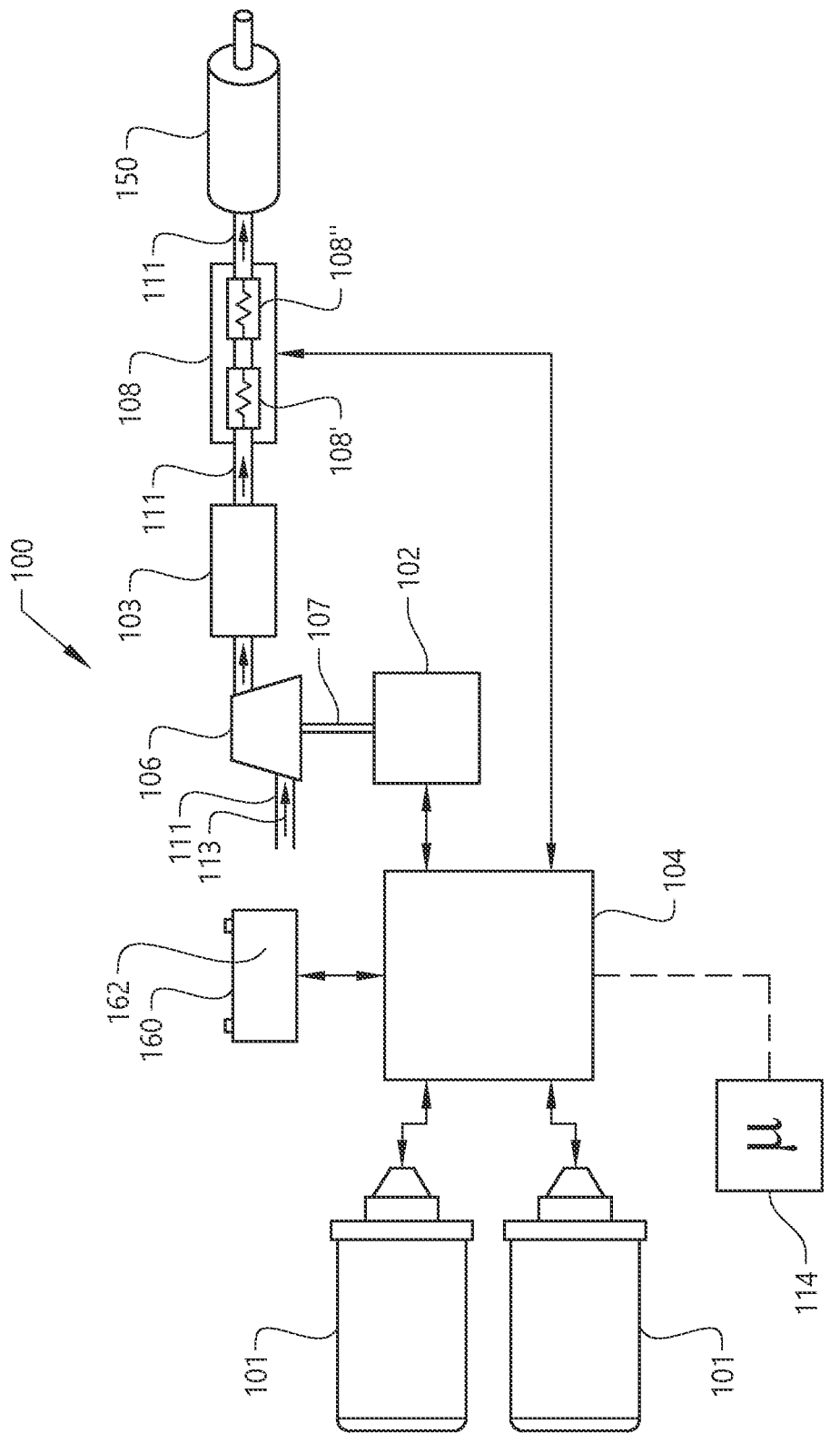
FIG. 2 is a schematic illustration of a braking system according to an example embodiment.

In order to describe the braking system 100 in further detail, reference is made to FIG. 2 which is a schematic illustration of a braking system according to an example embodiment. As can be seen in FIG. 2, the braking system 100 comprises an electric traction motor 101, in FIG. 2 illustrated as a pair of electric traction motors 101. The braking system 100 further comprises an electric power system 104 which is connected to the electric traction motor(s) 101 for supply of electric power to the electric power to the electric traction motor(s) 101 when the electric traction motor(s) 101 is/are propelling vehicle 10, and to receive electric power from the electric traction motor(s) 101 when the electric traction motor(s) 101 operates in a regenerative braking mode. Thus, the braking system 100 can be referred to as an auxiliary braking system 100.

The electric power system 104 further comprises an electric storage system 160. The electric storage system 160 is preferably arranged in the form of a vehicle battery and will in the following be referred to as a battery 162. The battery 162 is configured to receive electric power generated by the electric traction motor(s) 101 when the electric traction motor(s) 101 operates in the regenerative braking mode. The battery 162 is also arranged to supply electric power to the electric traction motor(s) 101 when the electric traction motor(s) 101 propel the vehicle 10. Although not depicted in FIG. 2, the electric power system 104 may comprise various components, such as traction inverters, brake inverters, a junction box, etc.

The above-described control unit 114 is connected to the electric power system 104. The control unit 114 comprises control circuitry for controlling operation of the electric power system. The control unit 114 thus receives data from the electric power system 104, such as e.g. a state-of-(SOC) of the battery 162, etc, and transmits control signals to the electric power system 104. As will be evident from the below disclosure, the control signals from the control unit 114 to the electric power system 104 may, for example, comprise instructions to which device the electric power system 104 should supply electric power during regenerative braking.

The braking system 100 further comprises an electric machine 102 connected to the electric power system 104. The electric machine 102 is thus operated by receiving electric power from the electric power system 104. The electric machine 102 is thus arranged as an electric power consumer. The braking system 100 also comprises an air blower 106. The air blower 106 is preferably an air compressor 106 and will in the following be referred to as such. The air compressor 106 is arranged in an air conduit 111 and configured to receive air 113. The received air 113 is pressurized by the air compressor 106 and supplied further through the air conduit 111 downstream the air compressor 106. The air compressor 106 is connected to, and operable by, the electric machine 102. As illustrated in FIG. 2, the air compressor 106 is mechanically connected to the electric machine 102 by an output shaft 107 of the electric machine 102. In further detail, the air compressor 106 is operated by rotation of the output shaft 107, which rotation is generated by operating the electric machine 102.

According to the exemplified embodiment in FIG. 2, the braking system 100 further comprises a flow restriction arrangement 103 in the air conduit 111. The flow restriction arrangement 103 is arranged in downstream fluid communication with the air compressor 106 and configured to increase the pressure level of the flow of air exhausted by the air compressor 106. The braking system 100 also comprises an air heating arrangement 108 in the air conduit 111. The air heating arrangement 108 comprises at least one electric air heater 108', 108", in FIG. 2 illustrated as a first electric air heater 108' and a second electric air heater 108". In the following, the air heating arrangement 108 will also be referred to as an electric brake resistor arrangement 108, and the electric air heater(s) will be referred to as electric brake resistors 108', 108".

The electric brake resistor arrangement 108 is arranged in the air conduit 111 in downstream fluid communication with the air compressor 106. The electric brake resistor arrangement 108 is also electrically connected to, and operable by, the electric power system 104. Thus, also the electric brake resistor arrangement 108 is arranged as an electric power consumer. When the electric brake resistor arrangement 108 receives electric power from the electric power system 104, the pressurized air from the air compressor is heated by the at least one brake resistor 108', 108". The pressurized and heated air is thereafter directed towards the ambient environment or other components in need of thermal management. The air from the electric brake resistor arrangement 108 is preferably directed into a muffler 150 of the braking system 100. The muffler 150 reduces noise and can also provide a pressure drop of the air.

The electric brake resistor arrangement 108 is preferably, although not depicted, connected to a cooling system in order to avoid excess heating. The cooling system may either be a liquid cooling system or an air cooling system. Thus, the electric brake resistor arrangement 108 may be a liquid cooled electric brake resistor arrangement 108 or an air cooled electric brake resistor arrangement 108.

Although not depicted in FIG. 2, it should be readily understood that the control unit 114 can be connected to other components in addition to the connection to the electric power system 104. For example, the control unit 114 may be connected to the electric traction motor(s) 101, the battery 162, the electric machine 102, the air heating arrangement 108, as well as connected to an upper layer vehicle control system (not shown).

During operation of the braking system 100, i.e., when the electric traction motor 101 operates as generators to control the vehicle speed, i.e. the vehicle 10 operates in the regenerative braking mode, electric power is transmitted from the electric traction motor 101 to the electric power system 104. If the battery 162 is not able to receive all, or parts of the electric power generated by the electric traction motor 101, for example because of the current electric charging capacity, i.e. the level of electric power the battery is able to receive until being fully charged or has reached its maximum allowed state of charge level, the excess electric power should preferably be dissipated. In the present case, the electric power system 104 is controlled to supply electric power to the electric machine 102. The electric machine 102 is hereby, by the received electric power from the electric power system 104, rotating the output shaft 107 to operate the air compressor 107. The air compressor 107 in turn pressurize air 117 and supply the pressurized air further through the air conduit 111.

Accordingly, the control circuitry of the control unit 114 determines a level of electric power dissipation for the electric power system 104, i.e., a level of electric power that should be dissipated since it is not suitable to supply such power to the battery 162. The level of electric power dissipation is hence a difference between the level of electric power generated during the regenerative braking and the current electric charging capacity of the battery 162. If the electric machine 102 is able to handle, i.e., receive and be operated by, electric power corresponding to the level of electric power dissipation, all excess electric power, i.e., the generated power not being supplied to the battery 162 for charging, is supplied to the electric machine 102.

However, the electric machine 102 has a motor dissipation threshold. In further detail, the motor dissipation threshold is a maximum capacity of how much electric power the electric machine 102 can receive. Another limiting factor could be a temperature level of the air compressor 106, as well as a temperature level of the electric machine 102, e.g., at high ambient temperature conditions. If the electric machine 102 receives too much electric power, the rotational speed of the output shaft 107 is at a risk of being too high, or the temperature level of the air compressor 106 could be to high.

As such, the control circuitry of the control unit 114 preferably compares the level of electric power generated during regenerative braking with the motor dissipation threshold. When the level of electric power generated during regenerative braking is higher than the motor dissipation threshold, the electric power system 104 is controlled to supply electric power also to at least one of the electric brake resistors 108', 108". The electric power system 104 may be controlled to supply electric power also to at least one of the electric brake resistors 108', 108" for other reasons than the electric power level being higher than the motor dissipation threshold, for example to simply reduce the rotational speed of the output shaft 107 to reduce the operation of the air compressor 106, i.e., the speed of the air compressor 106. The split of electric power supply to the electric machine 102 and the at least one electric brake resistor 108', 108" can also, for example, be controlled to provide a desired brake performance, a low outlet temperature and/or to reduce wear of components of the braking system 100, etc. In particular, the temperature level of the at least one electric brake resistor may be used as an input parameter when determining how much electric power to supply to the electric machine 102.

Further control functionalities of the braking system 100 will be given below in relation to the description of FIG. 4.

Figure 3:
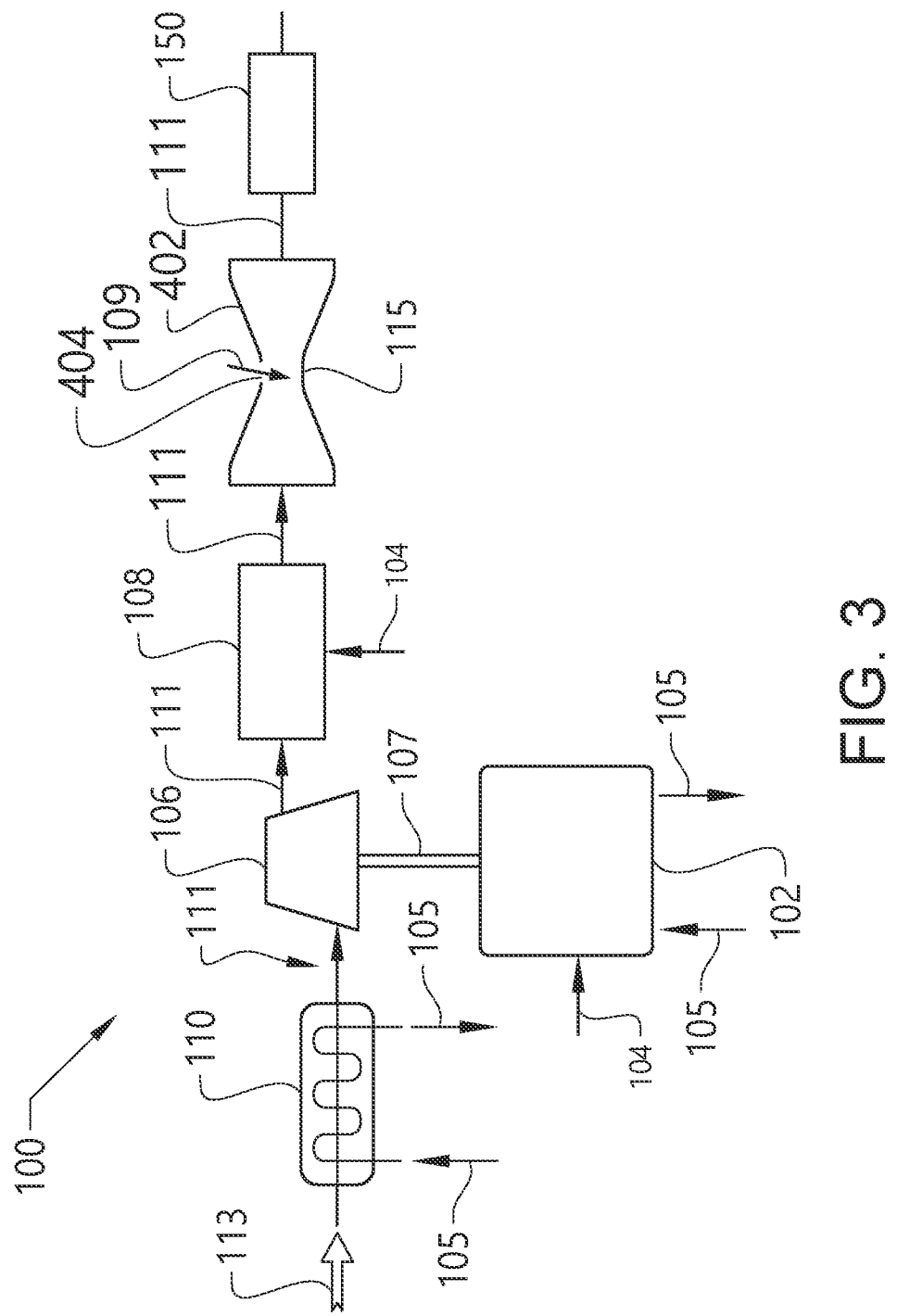
FIG. 3 is a detailed schematic illustration of the braking system according to another example embodiment.

Reference is now made to FIG. 3 in order to describe the braking system 100 according to another example embodiment. The FIG. 3 example is a further detailed illustration of components that may form part of the braking system 100. The embodiment in FIG. 3 only describes the components arranged in direct connection with the air conduit 111. The functional operation of the braking system 100 in FIG. 3 is thus the same as described above in relation to FIG. 2. The control unit 114 is omitted from FIG. 3 and the following description but should be construed as also being incorporated in this example embodiment.

As can be seen in FIG. 3, the braking system 100 comprises an electric machine 102 arranged to receive electric power 103 from the electric power system 104 described above in relation to FIG. 2. Moreover, the electric machine 102 can also be connected to a cooling system 105 of the vehicle 10. The cooling system 105 may either be a liquid cooling system or an air cooling system.

The braking system 100 further comprises the above described air compressor 106, which here is mechanically connected to, and operated by, the electric machine 102. Preferably, the air compressor 106 is mechanically connected to the electric machine 102 by the output shaft 107.

The braking system 100 further comprises the above described air heating arrangement 108, 110. In FIG. 3, one of the air heating arrangements 108, 110 is arranged upstream the air compressor 106 in the form of a heat exchanger 110. The air heating arrangement 108 arranged downstream the air compressor 106 is preferably of the same type as described above, i.e., an electric brake resistor arrangement 108.

Similar to the embodiment described in relation to FIG. 2, the electric air heating arrangement 108 may be arranged in the air conduit 111 at a position downstream the air compressor 106, i.e., for receiving pressurized air from the air compressor 106. The electric air heating arrangement 108 is connected to the electric power system 104.

As also described above, the electric air heating arrangement 108 is preferably implemented in the form of an electric brake resistor arrangement 108 comprising at least one electric brake resistor 108', 108". The electric air heating arrangement 108 thus receives the pressurized air from the air compressor 106, whereby the air is heated in the electric air heating arrangement by the electric power received from the electric power system 104. The air is thereafter preferably supplied towards the muffler 150 and further to the ambient environment or a component/structure in need of thermal management.

Further, the heat exchanger 110 is arranged in upstream fluid communication with the air compressor 106 in the air conduit 111. The heat exchanger 110 can instead be arranged further downstream in the air conduit 111, and the illustration in FIG. 3 is merely for illustrative purposes. The heat exchanger 110 is in FIG. 3 arranged as a heat exchanger connected to the cooling system 105 of the vehicle 10. Thus, the heat exchanger receives liquid fluid from the cooling system 105 and pre-heats the air before it is delivered to the air compressor 106. The heat exchanger 110 is thus preferably an air-to-liquid heat exchanger but may, as an alternative, be an air-to-air heat exchanger which uses relatively warm air to heat the air that is supplied to the air compressor 106. As a not depicted alternative, the heat exchanger 110 may be replaced by the electric machine 102. In such a case, the electric machine receives the air, and pre-heats the air before the air is supplied to the air compressor 106. The heat exchanger 110 may also be arranged at other positions of the material transportation system 100 than what is depicted in FIG. 3. For example, the heat exchanger 110 may be in the air conduit 111 downstream the air compressor 106.

Furthermore, the exemplified braking system 100 of FIG. 3 comprises a flow injecting arrangement 402 positioned in the air conduit 111. The flow injecting arrangement 402 is arranged in downstream fluid communication with the air compressor 106, i.e., the flow injecting arrangement 402 receives the pressurized air exhausted from the air compressor 106. Although the flow injecting arrangement 402 is depicted as being positioned downstream the air compressor 106, it could instead, or in addition, be arranged upstream the air compressor 106. Although not depicted in detail in FIG. 3, the flow injecting arrangement 402 comprises a portion configured to admit a flow of fluid into the flow of air exhausted from the air compressor 106. As can be seen in FIG. 3, the flow injecting arrangement 402 is arranged in the form of a venturi arrangement comprising a constricted portion 115. The flow injecting arrangement may as an alternative be formed by e.g. a pump injecting a flow through a nozzle, etc. The constricted portion 115 is arranged as a reduced diameter of the venturi arrangement in which the flow velocity of the flow of air from the air compressor 106 will increase. The portion configured to admit the flow of fluid into the venturi arrangement is preferably arranged at the constricted portion 115 of the venturi arrangement. As can be seen in FIG. 3, the portion is arranged as an orifice 404 in which a flow of fluid 109 can enter the constricted portion 115. According to the example embodiment depicted in FIG. 3, the venturi arrangement 402 is arranged in downstream fluid communication with the electric air heating arrangement 108. It should however be readily understood that the venturi arrangement 402 can be arranged in upstream fluid communication with the electric air heating arrangement 108, i.e., between the air compressor 106 and the electric air heating arrangement 108.

Although not illustrated in the figures, the braking system 100 may comprise further features, such as the flow restriction arrangement 103 described above and illustrated in FIG. 2, which is positioned in the air conduit 111 between the air compressor 106 and the electric air heating arrangement 108. Such flow restriction arrangement can thus advantageously increase the pressure level of the flow of air in the air conduit 111.

Figure 4:
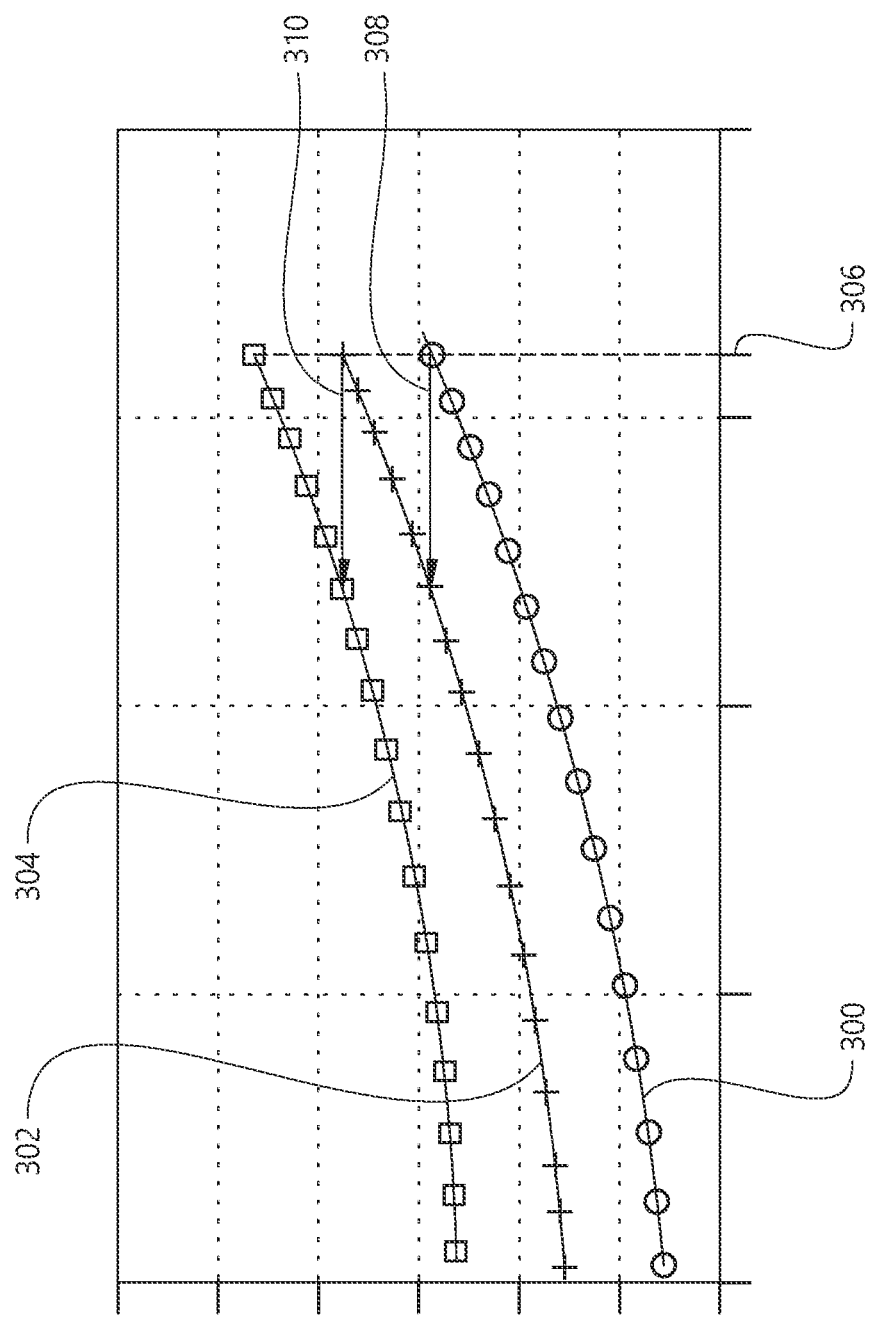
FIG. 4 is a graph illustrating example embodiments of electric power dissipation using the braking system of FIG. 2 or 3.

Reference is now made to FIG. 4 which is a graph illustrating example embodiments of electric power dissipation using the braking system 100 of FIG. 2 or 3. Thus, the graph illustrates different operating scenarios of the braking system 100 during regenerative braking. In FIG. 4, the horizontal x-axis represents an example embodiment of the rotational speed of the electric machine 102, i.e., the rotational speed of the output shaft 107 of the electric machine. The vertical y-axis represents an example embodiment of the level of electric power dissipation, i.e., the electric power dissipated during regenerative braking of the vehicle 10.

Furthermore, in FIG. 4, line 300 represents the electric power dissipation at different rotational speed of the electric machine 102 when the electric power system 104 supplies electric power only to the electric machine 102. Line 302 represents the electric power dissipation at different rotational speed of the electric machine 102 when the electric power system 104 supplies electric power to the electric machine 102 as well as to one of the electric brake resistors 108'. Finally, line 304 represents the electric power dissipation at different rotational speed of the electric machine 102 when the electric power system 104 supplies electric power to the electric machine 102 as well as to the first 108' and the second 108" electric brake resistors. In the non-limiting exemplified embodiment depicted in FIG. 4, each of the first 108' and second 108" electric brake resistors operate at 50 kW. Other power levels can of course be chosen for the electric brake resistors, and 50 kW only serves as an example embodiment.

According to a non-limiting example and with reference to line 300, i.e., when the electric power system 104 only supplies electric power to the electric machine 102, the electric power dissipation increases from approximately 25 kW at 25 000 revolutions per minute (RPM) of the electric machine 102 to approximately 150 kW at 42 000 RPM of the electric machine. When the electric power system 104 also supplies electric power to the first electric brake resistor 108', as can be seen by line 302, the electric power dissipation increases from approximately 75 kW at 25 000 RPM of the electric machine 102 to approximately 190 kW at 42 000 RPM of the electric machine. Finally, when the electric power system 104 supplies electric power to electric machine 102, the first electric brake resistor 108' and to the second brake resistor 108", as can be seen by line 304, the electric power dissipation increases from approximately 75 kW at 25 000 RPM of the electric machine 102 to approximately 240 kW at 42 000 RPM of the electric machine.

When the electric power system 104 supplies electric power to the electric machine 102, as seen in line 300, the electric machine reaches at approximately 42 000 RPM a maximum allowable rotational speed 306, i.e., the rotational speed reaches a threshold limit for the output shaft 107, an air compressor temperature threshold, a noise threshold limit, etc. In such a situation, the electric power system 104 is controlled to reduce the supply of electric power to the electric machine 102 by a first electric power level, and instead supply electric power of the first power level to the first electric brake resistor 108'. Hereby, a first power supply split 308 is performed by the electric power system 104. As can be seen, when the electric power system 104 performs the first power supply split 308, the electric power dissipation remains at the same level while at the same time reducing the rotational speed of the output shaft 107 of the electric machine 102. As such a more or less seamless split in power distribution is performed. Thereafter, the electric power system 104 can be controlled to supply more electric power to the electric machine 104, whereby the electric power dissipation can increase if e.g., the power dissipation demand increases. By means of the ability to perform the first power supply split 308, the electric brake resistor 108' can be used for performing large adjustments of the electric power dissipation, while the electric machine 102 can be used for fine tuning of the electric power dissipation.

As can be seen in FIG. 4, the electric power system 104 can also perform a second power supply split 310 at which the electric power system 104 also supplies electric power to the second electric brake resistor 108". In FIG. 4, this is illustrated when the rotational speed of the output shaft reaches the maximum allowable rotational speed 306. When the electric power system 104 performs the second power supply split 310, a substantially seamless split in power distribution is performed where, again, the rotational speed of the output shaft 107 is reduced while maintaining the electric power dissipation remains at the same level as before the second power supply split 310 was performed.

It should be readily understood that the electric power system 104 is also configured to perform the first 308 and second 310 power supply splits simultaneously. In such situation, the rotational speed of the output shaft 107 is even further reduced in one step. According to the exemplified illustration of FIG. 4 and when such simultaneous power supply split is performed when the electric machine 102 is operated at the maximum allowable rotational speed 306, the electric power dissipation remains at 150 kW while reducing the rotational speed from approximately 42 000 RPM to 32 000 RPM.

Accordingly, and to simplify with the exemplified 50 kW electric brake resistors 108', 108", when activating e.g., the first electric brake resistor 108', the electric power system 104 reduces the supply of electric power to the electric machine 102 by 50 kW, whereby the rotational speed of the output shaft 107 is reduced. When activating the second electric brake resistor 108", the electric power system 104, again, reduces the supply of electric power to the electric machine 102 by 50 kW.

Figure 5:
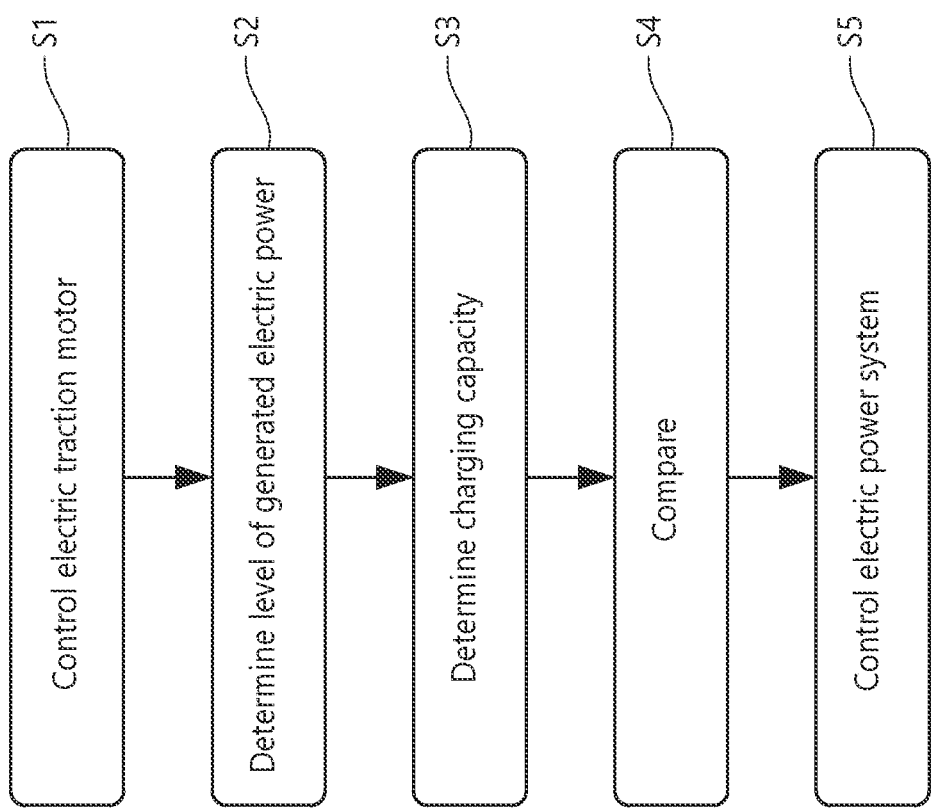
FIG. 5 is a flow chart of a method of controlling the braking system according to an example embodiment.

In order to sum up, reference is made to FIG. 5 which is a flow chart of a method of controlling the above-described braking system 100. During operation of the vehicle 10 and when there is a desire to control the vehicle speed, the electric traction motor 101 is controlled S1 to perform regenerative braking of the vehicle 10. A level of electric power generated by the electric traction motor 101 during the regenerative braking is determined S2, and a current electric charging capacity of the battery 162 is determined S3.

The level of generated electric power is compared S4 with the charging capacity. When the level of electric power generated during the regenerative braking is higher than the current charging capacity of the battery 162, the electric power system 104 is controlled to supply electric power to the electric machine 102.

It is to be understood that the present disclosure is not limited to the embodiments described above and illustrated in the drawings; rather, the skilled person will recognize that many changes and modifications may be made within the scope of the appended claims.

The invention claimed is:

1. A braking system for a vehicle comprising:
an electric traction motor configured to propel the vehicle and to controllably regenerate electric power during regenerative braking of the vehicle,
an electric machine comprising an output shaft,
an air blower connected to the output shaft of the electric machine, the air blower being operable by the electric machine by rotation of the output shaft, wherein the air blower is arranged in an air conduit,
an electric power system electrically connected to the electric machine, the electric power system comprising an electric storage system configured to receive and supply electric power, wherein the electric machine is operated by electric power received from the electric power system, the electric power system being further electrically connected to the electric traction motor and configured to receive electric power during regenerative braking,
an air heating arrangement comprising at least one electric air heater, the air heating arrangement being arranged in the air conduit in downstream fluid communication with the air blower, wherein at least one electric air heater is electrically connected to, and operable by, the electric power system, and
a control unit connected to the electric power system, the control unit comprising control circuitry configured to:
receive a signal indicative of a regenerative braking request for the vehicle,
determine a level of electric power generated by the electric traction motor during the regenerative braking of the vehicle,
receive a signal indicative of a current electric charging capacity of the electric storage system,
compare the level of electric power generated during the regenerative braking with the current electric charging capacity of the electric storage system,
control the electric power system to supply electric power to the electric machine during the regenerative braking when the level of electric power generated during the regenerative braking is higher than the current charging capacity of the electric storage system,
determine a level of electric power dissipation of the electric power system, when the level of electric power generated during the regenerative braking is higher than the current electric charging capacity the level of electric power dissipation being a difference between the level of electric power generated during the regenerative braking and the current electric charging capacity of the electric storage system, and
control the electric power system to supply electric power to the electric machine based on the level of electric power dissipation.

2. The braking system of claim 1, wherein the control circuitry is further configured to:
compare the level of electric power dissipation with a motor dissipation threshold of the electric machine, and
control the electric power system to supply the electric power to the electric machine and to the at least one electric air heater when the level of electric power dissipation is higher than the motor dissipation threshold.

3. The braking system of claim 1, wherein a level of electric power supplied to the electric machine is based on a temperature level of the at least one electric air heater.

4. The braking system of claim 1, wherein the control circuitry is further configured to:
receive a signal indicative of a rotational speed of the output shaft of the electric machine, and
control the electric power system to reduce the supply of electric power to the electric machine by a first electric power level and to supply electric power of the first electric power level to the air heating arrangement when the rotational speed exceeds a threshold limit.

5. The braking system of claim 4, wherein the control circuitry is further configured to:
control the electric power system to increase the supply of electric power to the electric machine after the supply of electric power by the first electric power level to the air heating arrangement.

6. The braking system of claim 1, wherein the at least one electric air heater comprises a first air heater and a second electric air heater arranged in series with each other.

7. The braking system of claim 6, wherein the control circuitry is further configured to:
control the electric power system to supply electric power to each of the first and second electric air heaters.

8. The braking system of claim 6, wherein the control circuitry is configured to:
control the electric power system to supply electric power to the first electric air heater when the level of electric power dissipation reaches a first dissipation threshold.

9. The braking system of claim 8, wherein the control circuitry is configured to:
control the electric power system to supply electric power to the second electric air heater when the level of electric power dissipation reaches a second dissipation threshold, the second dissipation threshold being higher than the first dissipation threshold.

10. A vehicle comprising the braking system of claim 1.

11. A method of controlling a braking system for a vehicle, the braking system comprising:
an electric traction motor configured to propel the vehicle and to controllably regenerate electric power during regenerative braking of the vehicle,
an electric machine comprising an output shaft,
an air blower connected to the output shaft of the electric machine, the air blower being operable by the electric machine by rotation of the output shaft, wherein the air blower is arranged in an air conduit,
an electric power system electrically connected to the electric machine, the electric power system comprising an electric storage system configured to receive and supply electric power, wherein the electric machine is operated by electric power received from the electric power system, the electric power system being further electrically connected to the electric traction motor and configured to receive electric power during regenerative braking, and
an air heating arrangement comprising at least one electric air heater, the air heating arrangement being arranged in the air conduit in downstream fluid communication with the air blower, wherein the at least one electric air heater is electrically connected to, and operable by, the electric power system,
wherein the method comprises the steps of:
controlling the electric traction motor to perform regenerative braking for the vehicle,
determining a level of electric power generated by the electric traction motor during the regenerative braking of the vehicle, determining a current electric charging capacity of the electric storage system, comparing the level of electric power generated during the regenerative braking with the current electric charging capacity of the electric storage system, controlling the electric power system to supply electric power to the electric machine during the regenerative braking when the level of electric power generated during the regenerative braking is higher than the current charging capacity of the electric storage system, determining a level of electric power dissipation of the electric power system, when the level of electric power generated during the regenerative braking is higher than the current electric changing capacity, the level of electric power dissipation being a difference between the level of electric power generated during the regenerative braking and the current electric charging capacity of the electric storage system, and controlling the electric power system to supply electric power to the electric machine based on the level of electric power dissipation.

12. A computer program comprising program code means for performing the steps of claim 11 when the program code means is run on a computer.

13. A computer readable medium carrying a computer program means for performing the steps of claim 11 when the program means is run on a computer.

* * * * *